US009442880B2

(12) United States Patent
Sixt

(10) Patent No.: US 9,442,880 B2
(45) Date of Patent: Sep. 13, 2016

(54) METHOD FOR DETERMINING THE TOPOLOGY OF A SERIAL ASYNCHRONOUS DATABUS

(71) Applicant: Softing AG, Haar (DE)

(72) Inventor: Stefan Sixt, Unterhaching (DE)

(73) Assignee: SOFTING AG, Haar (DE)

( * ) Notice: Subject to any disclaimer, the term of this patent is extended or adjusted under 35 U.S.C. 154(b) by 395 days.

(21) Appl. No.: 13/786,198

(22) Filed: Mar. 5, 2013

(65) Prior Publication Data

US 2013/0254443 A1    Sep. 26, 2013

(30) Foreign Application Priority Data

Mar. 6, 2012  (DE) ................. 10 2012 101 881

(51) Int. Cl.
| | | |
|---|---|---|
| *H04L 12/28* | (2006.01) | |
| *G06F 13/42* | (2006.01) | |
| *H04L 12/40* | (2006.01) | |
| *H04L 12/24* | (2006.01) | |

(52) U.S. Cl.
CPC ..... *G06F 13/4295* (2013.01); *H04L 12/40078* (2013.01); *H04L 12/40084* (2013.01); *H04L 12/40136* (2013.01); *H04L 41/12* (2013.01)

(58) Field of Classification Search
CPC .................................................... H04L 41/12
USPC .................................. 370/254–257; 709/224
See application file for complete search history.

(56) References Cited

U.S. PATENT DOCUMENTS

| | | | | |
|---|---|---|---|---|
| 4,293,857 | A | * | 10/1981 | Baldwin ..................... 342/32 |
| H000388 | H | * | 12/1987 | Lloyd ........................ 367/19 |
| 5,054,911 | A | * | 10/1991 | Ohishi et al. ............... 356/5.07 |
| 5,778,172 | A | * | 7/1998 | Riedle et al. ................... 726/9 |
| 6,246,361 | B1 | * | 6/2001 | Weill et al. ............. 342/357.57 |
| 6,879,806 | B2 | * | 4/2005 | Shorty ........................ 455/11.1 |
| 6,959,333 | B2 | * | 10/2005 | Beaumont et al. ........... 709/223 |
| 7,054,554 | B1 | * | 5/2006 | McNamara et al. ........... 398/30 |
| 7,065,584 | B1 | * | 6/2006 | Shavitt et al. ................. 709/241 |
| 7,075,895 | B1 | * | 7/2006 | Hanam ........................ 370/254 |
| 7,308,517 | B1 | | 12/2007 | Hauck |
| 7,394,772 | B2 | * | 7/2008 | Shin et al. .................. 370/254 |
| 7,636,321 | B1 | * | 12/2009 | Iannaccone et al. .................. H04L 43/0864 370/252 |
| 8,427,969 | B1 | * | 4/2013 | Juillard ....................... 370/252 |
| 2002/0120727 | A1 | * | 8/2002 | Curley et al. ................. 709/223 |
| 2003/0086425 | A1 | * | 5/2003 | Bearden et al. ............. 370/392 |
| 2003/0142587 | A1 | * | 7/2003 | Zeitzew ....................... 367/127 |
| 2004/0054776 | A1 | * | 3/2004 | Klotz et al. .................. 709/224 |
| 2004/0070745 | A1 | * | 4/2004 | Lewis et al. ................. 356/5.01 |
| 2004/0098514 | A1 | | 5/2004 | Schuster |
| 2005/0135257 | A1 | * | 6/2005 | Stephens et al. ............. 370/241 |
| 2006/0104198 | A1 | * | 5/2006 | Takano ....................... 370/210 |
| 2008/0140874 | A1 | | 6/2008 | Endl et al. |

(Continued)

FOREIGN PATENT DOCUMENTS

| | | |
|---|---|---|
| DE | 19710971 A1 | 9/1998 |
| DE | 10048741 C1 | 1/2002 |
| DE | 102005055429 A1 | 5/2007 |
| DE | 102005055964 A1 | 5/2007 |

(Continued)

*Primary Examiner* — Paul R Myers
(74) *Attorney, Agent, or Firm* — Grossman, Tucker, Perreault & Pfleger, PLLC

(57) ABSTRACT

A computer-implemented method for determining the topology of a serial asynchronous data bus, to which at least a first bus subscriber and a second bus subscriber are connected, which subscribers communicate via a prescribed bus access protocol.

17 Claims, 6 Drawing Sheets

(56) References Cited

U.S. PATENT DOCUMENTS

| | | | |
|---|---|---|---|
| 2008/0144534 A1* | 6/2008 | Gross | 370/257 |
| 2010/0159842 A1* | 6/2010 | Fukagawa et al. | 455/67.11 |
| 2012/0162014 A1* | 6/2012 | Wu et al. | 342/387 |
| 2012/0224549 A1* | 9/2012 | Myers et al. | 370/329 |
| 2013/0019008 A1* | 1/2013 | Jorgenson et al. | 709/224 |

FOREIGN PATENT DOCUMENTS

| | | |
|---|---|---|
| DE | 102006051444 A1 | 5/2008 |
| DE | 102010000249 A1 | 8/2011 |
| EP | 1061707 A2 | 12/2000 |
| WO | WO0228061 A1 | 4/2002 |
| WO | WO2007116361 A2 | 10/2007 |

\* cited by examiner

US 9,442,880 B2

METHOD FOR DETERMINING THE TOPOLOGY OF A SERIAL ASYNCHRONOUS DATABUS

BACKGROUND

A method is described for determining the topology of a serial asynchronous databus, to which at least a first bus subscriber and a second bus subscriber are connected, which subscribers communicate via a prescribed bus access protocol.

The method can basically be used on all serial databuses, in particular on fieldbus systems such as PROFIBUS, Fieldbus Foundation, but also on Ethernet and other fieldbus systems of known art and yet to be developed. A fieldbus connects field units in a system such as sensors and actuators, also designated as slaves, for purposes of communication and control with a control unit, also designated as the master. Since a plurality of subscribers transmit messages over the same line, a standardised bus access protocol is defined for each fieldbus system.

As a rule a fieldbus system comprises at least one master field unit (master) for purposes of controlling the system, and also a plurality of slave field units (slaves). Each bus subscriber is addressed by means of a uniquely associated address. The communication in a fieldbus system takes place via bus-specific telegrams or data packets or data frames, whereby the master as a rule controls the communication and transmits request telegrams, to which the slaves respond with response telegrams.

As a rule fieldbus systems have a complex network topology with a large number of bus segments and bus subscribers. For example, a PROFIBUS DP-network can have up to 127 subscribers, whereby up to 32 bus subscribers can be connected to individual bus segments of a bus line. Within the network the individual bus segments are connected by means of line drivers, so-called repeaters. In order to be able to undertake diagnostics and fault analysis in such a bus system, it is necessary for the network topology of the bus system, i.e. the arrangement of the bus segments, and of the subscribers on the individual bus segments, to be known. When troubleshooting, for example, the connected units, when observing signal quality, should be observed as far as possible in the order of their distance from the measurement unit, in order that the correct fault location can be determined. Also the topology of the fieldbus should be known when planning physical measurements, because measurements are best executed from the ends and the centre of the individual bus segments. If the order and length of the bus segments and the connection points of the units to the segments are not known, measurements cannot be planned efficiently.

Since fieldbus systems often have structures that have "evolved" and are poorly documented, it is also often the case that insufficient knowledge is available concerning the bus topology. Since, however, the lines of the fieldbus systems are often laid in cable ducts that are inaccessible, it is as a rule also impossible to keep track directly of the lines of a bus system so as to measure them easily. Various measurement methods for determining the topology of fieldbuses have therefore been developed.

In the case where a cable of the bus line has a known resistance per unit length the bus topology can be registered on the basis of DC current measurements, in that one-by-one the individual bus subscribers are located, and the length of the line from the measurement point up to the bus subscriber is determined via the DC resistance of the line. This method only delivers inaccurate results, because unknown influence factors such as contact resistances between connectors and cables distort the measurement result.

A more precise measurement method is a reflection-based run time measurement, which determines the cable length as a function of the known propagation velocity of the measurement signals. These reflection measurement methods are active measurement methods, i.e. they transmit active signals onto the bus and register the reflected signals. This means that the measurement methods as far as possible are only executed on a bus that is inoperative, because the transmitted test signals would interfere with the ongoing operation of the fieldbus. There are in fact also methods that execute active measurements during regular bus operation, in that they utilise transmission intervals provided by the bus access protocol for the measurements; however, these methods always contain the risk that the transmitted signals are nevertheless interfering with the communications on the bus.

WO 02/28061 A1 (also published as US 2001/098514 A1) describes a method for determining the network topology of a bus system, in which an initiating measurement telegram is transmitted to each bus subscriber, to which a diagnostic repeater, which combines a plurality of bus segments, responds with a segment identification and the other bus subscribers respond with a response telegram, whereby the diagnostic repeater also transmits a measurement signal to the responding bus subscribers, which is reflected by the latter, and whereby, from the time interval between the transmission of the measurement signal and the arrival of the reflection signals, the distance of the responding bus subscriber from the diagnostic repeater is determined. This method basically utilises the run time of the measurement signal, which is impressed on the response telegram of the slave, for purposes of determining the distances of the individual bus subscribers. A transmitting slave acts as an impedance, at which the measurement signal is reflected. The diagnostic repeater therefore waits until it receives the response telegram from the slave. At this point in time the slave transmits again, since the signal run times are smaller than the transmission time of the telegram. A time window within the telegram, during which the level does not alter, is then used for the reflection method. The method is a pure reflection method and is well-suited to the lower baud rates. At higher baud rates the time window for the measurement is very small and the measurement is therefore unreliable.

DE 100 48 741 C1 and DE 10 2005 055 429 A1 likewise describe methods and devices for purposes of line diagnostics of a bus system in accordance with the principle of reflection measurement.

DE 10 2010 000 249 A1 of the applicant describes a method for checking the electrical properties of a cable of a fieldbus system, whereby this method is based on altering the wiring configuration of the fieldbus for the individual measurements. For this purpose a configurable switching device is provided, which can be connected with the bus.

The diagnostic methods for determining the bus topology in the prior art are thus based almost exclusively on reflection measurements. The method for measuring the electrical resistance of the line represents the single exception. Most reflection methods, and also the electrical method, assume an inoperative bus. These measurements can therefore not be executed during ongoing operation of the bus. The accuracy of the reflection measurement decreases with increasing data transfer baud rate.

Another type of diagnostic method for a fieldbus system is of known from DE 10 2006 051 444 A1. This method serves not so much the purpose of determining the bus topology as that of determining the states of the bus subscribers by the registration and analysis of the data packets exchanged on the bus, and by means of an in-line derivation of the states of the bus subscribers as a type of state machine.

BRIEF DESCRIPTION OF THE DRAWINGS

Examples of methods are explained in more detail with reference to the drawings. In the figures.

DESCRIPTION OF THE EXAMPLES OF EMBODIMENT

Figure 1:
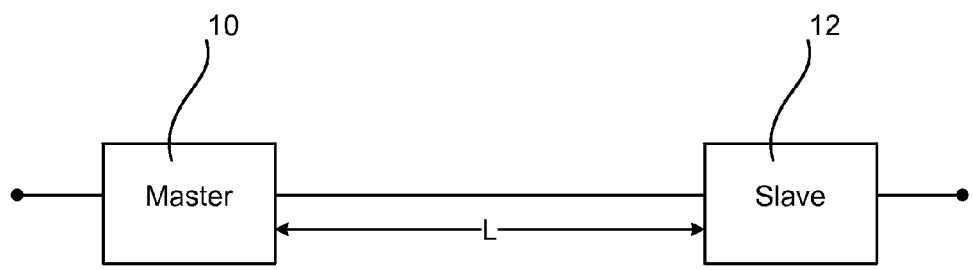
FIG. 1 shows a simplified schematic representation of a fieldbus with one master and one slave.

A method is proposed for determining the topology of a serial asynchronous databus, whereby at least a first bus subscriber and a second bus subscriber are connected to the databus, which subscribers communicate via a prescribed bus access protocol. The protocol comprises defined request and response telegrams. Examples of the method can be applied on a fieldbus system, to which are connected at least one master unit as a first bus subscriber, and a plurality of slave units as second bus subscribers. The first bus subscriber, e.g. the master, transmits request telegrams, which are received by the second bus subscriber, e.g. a slave. In response to each request telegram the slave transmits in each case a response telegram, and the response telegrams are in turn received by the first bus subscriber. For the first bus subscriber the time differences between the transmission of a particular request telegram and the reception of the related response telegram are determined at a first measurement site on the databus; these ensue from the time delays between the request and response telegrams at the measurement site, wherein this first measurement site is associated with the first bus subscriber, e.g. the master. The first site location can be located directly at the first bus subscriber or, as viewed from the second bus subscriber, beyond the first bus subscriber. An average response time, which is associated with the first bus subscriber, is calculated from the plurality of differences determined for the first bus subscriber. This average response time is e.g. the average response time of a particular slave that is measured at the master (first bus subscriber). From the difference between the average response time that is associated with the first bus subscriber, and the average response time that is associated with the second bus subscriber, can be derived the run time delay, and thus the distance between the first bus subscriber and the second bus subscriber. The average response time that is associated with the second bus subscriber, can be determined, in accordance with the same measurement principle in the same method cycle, as the average response time that is associated with the first bus subscriber. Or it can be determined in advance for each second bus subscriber and stored in the form of an additional database. The determination in advance can take place in accordance with the above described measurement principle, or in accordance with another measurement principle.

For purposes of determining the average response time that is associated with the second bus subscriber, a plurality of time differences can thus be measured for the second bus subscriber between the transmission of a particular request telegram and the reception of the related response telegram at a second measurement site on the databus that is associated with the second bus subscriber, and the average response time can be calculated from this plurality of differences determined for the second bus subscriber. The first and second measurement site are located at positions on the databus that are arranged either at the respective bus subscribers, or along the databus on the sides of the bus subscribers that are facing away from the connecting length between the two bus subscribers. The second measurement site can, for example, be located at one end of the bus beyond the last second bus subscriber, while the first measurement site is arranged in the vicinity of the first bus subscriber, provided that the latter is a master.

Examples of the method are thus based on the determination of the average response times that are measured at particular positions, and allow the signal run times, and thus the distances between bus subscribers, to be determined from these. In the simplest case of a linear topology of the databus, with one master at one end of the bus and a plurality of slaves connected in series, two sets of measurements are sufficient for the implementation of the method. One set of measurements is executed directly at the master, or, as viewed from the slaves, beyond the master, and one set of measurements is executed at the last slave in the series, or, as viewed from the master, beyond the last slave in the series. At each measurement site a set of measurements is executed for each slave, in which the time differences between pairs of request and response telegrams that are associated with this slave are registered, and an average response time is calculated for each slave, namely as seen at the first measurement site, and as seen at of the second measurement site, respectively. The difference between the average response times at the two measurement positions allows the determination of the signal run time between the first bus subscriber, e.g. the master, and each second bus subscriber, e.g. the slave.

The measurements at the different measurement sites need not be executed synchronously, but rather they can be executed in sequence using a measurement unit that is connected in sequence at the first and second measurement sites.

The measurements also need not be undertaken directly at the first and the second bus subscribers, that is to say, for example, at the master, or at the slave. In one example, the measurements are located externally to the connection between master and slave, and on different sides of this connection. With the time calculation of the differences for purposes of determining the run time delay the cable lengths that are traversed to the same extent by the request telegram and by the response telegram, en route to the measurement unit, are then cancelled out. As explained, it is sufficient for the measurement of the distances between a plurality of slaves, which are connected in series one behind the other, to execute one measurement at the master and one measurement at or behind the last slave in the series. The measurements do not have to be performed at each slave. If the average response times of the slaves have been determined in advance, the execution of one set of measurements at or in the vicinity of the master is sufficient.

The method can be executed while data traffic is ongoing, and evaluates the transmission and reception times of defined request and response telegrams that are regularly exchanged over the databus. Telegrams can be used that, for example, are sent often, and to as many subscribers as possible. In the case of PROFIBUS these are, for example, the data exchange telegrams and the FDL (Fieldbus Data Layer) status telegrams. The data exchange telegrams are sent in each PROFIBUS cycle to each configured bus subscriber. Since the cycle times here are often in the order of milliseconds, many measurements can be executed in a short time. The FDL status telegram, on the other hand, has the advantage that it is transmitted to each address, has a fixed magnitude, and is often already responded to by the hardware of the bus subscriber. By this telegram all units can be registered, and the response times as a rule have less scatter than is the case in more complex types of telegrams. However, it is also possible to base the method on other types of telegrams.

By determining a plurality of response times at different positions within the databus network, and evaluating of the average response times, it is possible to filter out delays and time variations during the transmission of response telegrams that are not functions of the run time. The run time delay $T_L$ between the first and second bus subscriber is, for example, calculated as follows:

$$T_L = \frac{(\overline{T}_{res1} - \overline{T}_{res2})}{2}, \quad (1)$$

where $\overline{T}_{res1}$ is the average response time that is associated with the first bus subscriber, and $\overline{T}_{res2}$ is the average response time that is associated with the second bus subscriber. In the difference delays that are not functions of the run time are cancelled out, as are delays by virtue of line lengths between the bus subscribers and the measurement unit that are traversed to an equal extent by request and response telegrams.

If the response times are approximately distributed in accordance with a standard distribution, then the uncertainty in the average value decreases with an increasing number of measured values. A first estimate of the error of the average response time MW(T) is given by:

$$\text{Error}(MW(T))=SD(T)/N$$

where SD(T) is the standard deviation of the response times and N is the number of measurements.

Provided that a databus or databus section has a linear topology, the order of the slave units along the databus can be directly determined from the run time delays between the master unit is and the plurality of slave units in each case. If the same or nearly the same run time is determined for a plurality of slave units, this is an indication of a branch-off point in the databus. The following further steps in the method can then be executed: Determining a plurality of time differences for a slave unit between the reception of request telegrams and the transmission of related response telegrams at a third measurement site on the databus that is associated with the slave unit, whereby the third measurement site is located beyond the databus branch-off point, either at the slave unit, or, as viewed from the master unit, beyond the slave unit, and calculating an average response time that is associated with the slave unit that is located in the databus branch, from the plurality of differences determined for the slave unit. For each branch-off point on the databus an additional set of measurements can be executed, whereby the second, third and all other measurement sites are arranged at the end of the respective branching bus segment.

In examples of embodiment all measurements are executed under the same operating conditions with respect to the state and physical parameters of the databus.

The method can increase the accuracy of the distance determination by increasing the number of measurements. For example, the first and the second average values can be derived from at least 20 response times, or from at least 50, or even from at least 100 response times. It is also possible to first derive the first and second average values from only a relatively few response times, and with progressive measurement duration and determination of additional response times, to increase the precision and resolution of the average value.

While in the case of the above-described reflection measurements of the prior art the precision of topology determination decreases with increasing data transfer baud rate, testing of the current method has shown that the precision of topology determination increases with increasing data transfer baud rate. One reason for this is the fact that with increasing baud rates higher sampling frequencies are used that are accompanied by more precise time stamps and better time resolution. Since the cycle times are likewise shorter it is possible to determine more measured values within the same time periods. Also when operating at higher baud rates the degree of variation or fluctuation of the bus subscribers when transmitting response telegrams is less. If one starts from the assumption that the degree of variation when transmitting response telegrams of a bus subscriber only lies within one bit time, then at a baud rate of 12 Mbytes this bit time only amounts to 83 ns, while at a baud rate of 1.5 Mbytes the bit time amounts to 667 ns and at lower baud rates is correspondingly higher. With the assumption of a data propagation velocity that amounts to approximately 60% of the velocity of light, that is to say, 4.3 ns/m, a variation of the response time of one bit width at 12 Mbaud (83 ns) therefore corresponds to approximately 19 m, and at 1.5 Mbaud (667 ns) to approximately 155 m. From this simple comparison it can be discerned that the method with higher transfer rates should achieve more accurate measurements.

Examples specify a method for determining the topologies of a serial asynchronous databus, which is based on the evaluation of data traffic telegrams that are exchanged during the regular operation of the bus. The method can be implemented by simply listening into the telegrams with the aid of a measurement unit at at least one measurement location on the databus, provided that the average response times of the slaves are known, or at at least two measurement locations on the databus, if the average response times of the slaves are yet to be determined. No particular wiring configuration is necessary for the databus, neither do special measurement telegrams, or other measurement signals, need to be transmitted for measurements of the run times and determination of the topology. Practical tests using the method have shown that precise and reliable results can be obtained within even short measurement cycles.

Examples of the method are based on the following deliberations. In the simplest case the network consists of a master 10 (as an example of a first bus subscriber) and a slave 12 (as an example of a second bus subscriber); these are connected with one another via a cable of length L, as represented in FIG. 1.

Figure 2:
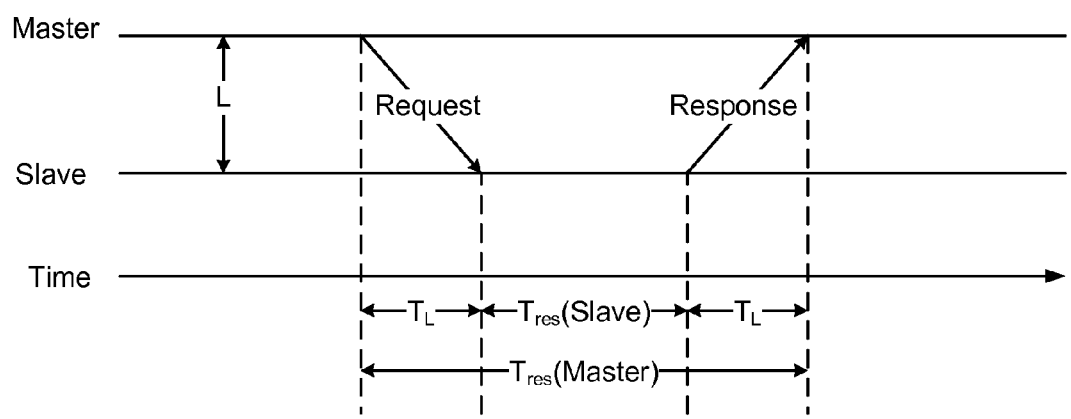
FIG. 2 shows a simplified schematic representation of the signal run times between the master and slave of the fieldbus system in FIG. 1.

The request telegram is transmitted from the master 10 and after the run time $T_L$ is received by the slave. After a certain delay time ($T_{res}$(Slave)) the latter transmits the response, which after the same run time $T_L$ arrives at the master. This is illustrated in FIG. 2. The response time of the slave, as measured at the master $T_{res}$(Master), is:

$$T_{res}(\text{Master}) = T_L + T_{res}(\text{Slave}) + T_L \qquad (2)$$

where $T_L$ is the run time of the signal between master and slave, and $T_{res}$(Slave) is the time that the slave requires after receiving the telegram until it sends off the response. If measurements are taken at the slave, the response time $T_{res}$(Slave) is obtained, since here the run times are omitted.

The difference between the two response times $T_{res}$(Master)$-T_{res}$(Slave) is twice the run time, in accordance with Equation (1) as specified above. The distance L then is:

$$L = T_L * v_{sig} \qquad (3)$$

where $v_{sig}$ represents the signal propagation velocity in the fieldbus cable. In this example it is assumed to be approx. 60% of the velocity of light, i.e. approx. 4.3 ns/m.

If one could therefore register the same signals, namely the request and response telegrams, at the two measurement points on the master and slave, one could, on the assumption of an ideal system, determine the distance between master and slave directly. For this purpose, however, one would need two or more measurement units, in order to register the transmission and reception times, or reception and transmission times, for the same request and response telegrams, at the master and slave.

With successive measurements at the master, and at or beyond one or a plurality of slaves, examples of the method can register various signals at different points in time, and can determine the run time and thus the distance between master and slave from an evaluation of the difference between the average response times. Provided that the time variations of the response times are statistically distributed, the average value deviation decreases with the number of measurements. For the average values MW of the response times, with respect to the measurements at the master, the following applies:

$$MW(T_{res}(\text{Master})) = MW(T_L + T_{res}(\text{Slave}) + T_L) = T_L + MW(T_{res}(\text{Slave})) + T \qquad (4)$$

Assuming that the average response time of the slave MW($T_{res}$(Slave)) does not alter, the latter can be determined by means of a later measurement at the slave. The difference between the average response times then is twice the run time, in accordance with the above Equation (1).

By the calculation of average values, delays of the measurement units can be filtered out, as can systematic and statistically distributed variations of the response times of the second bus subscribers, e.g. slaves.

In what follows it is explained with reference to FIGS. 3 to 6, how a measurement set-up can be constructed on a databus with a linear topology, with one master 10 and one slave 12, according to one example. As explained above, the two measurement sites (1) and (2) do not have to be arranged directly at the master 10 and slave 12 respectively. It is sufficient for the measurement sites (1) and (2) to be arranged at or on either side of the connection between master 10 and slave 12. The measurement set-ups in FIGS. 3, 4 and 5 deliver the same results.

Figure 3:
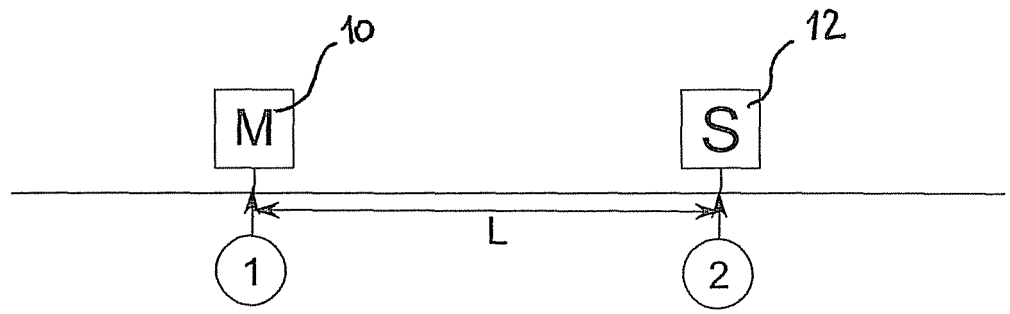
FIG. 3 shows a simplified schematic representation of a fieldbus with one master and one slave for purposes of explaining an example.

In the measurement set-up of FIG. 3 the two measurement sites (1) and (2) are arranged directly at the master 10 and slave 12 respectively. At measurement site (1) is determined the average response time that is associated with the first bus subscriber (master), and at measurement site (2) is determined the average response time that is associated with the second bus subscriber (slave). In the calculation of the difference between the average response times in each case the average response time of the slave ($T_{res}$(Slave)) is cancelled out, so that the result ensues directly as twice the run time.

Figure 4:
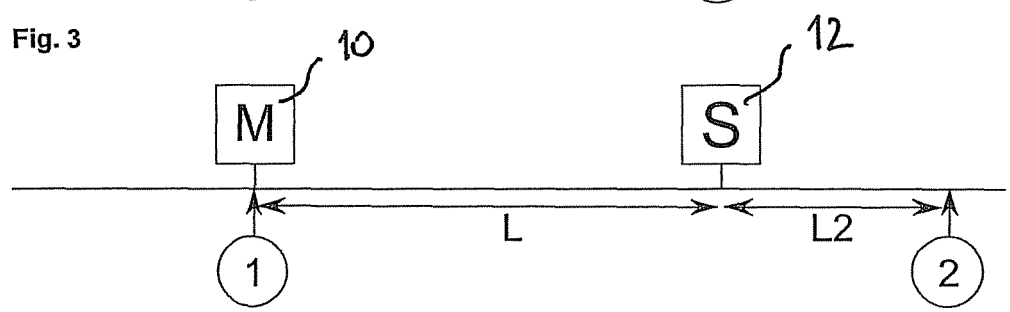
FIG. 4 shows a similar representation to that in FIG. 3 for purposes of explaining a first measurement set-up in accordance with an example.
Figure 5:
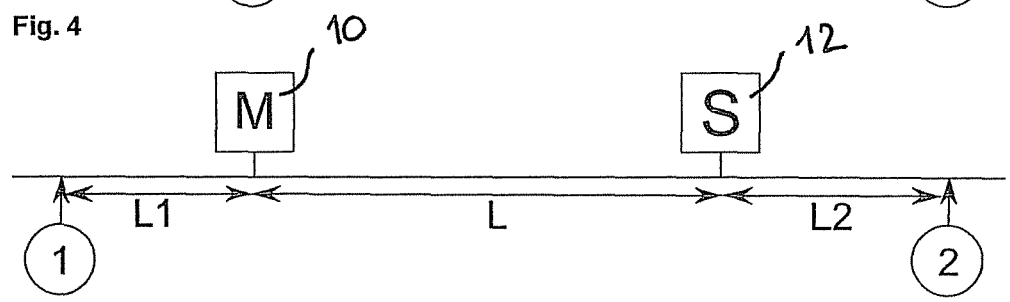
FIG. 5 shows a similar representation to that in FIG. 3 for purposes of explaining a second measurement set-up in accordance with an example.

In the measurement set-up of FIG. 4 the measurement site (2), as viewed from the master 10, is arranged beyond the slave 12, and in the measurement set-up of FIG. 5 the measurement site (1), as viewed from the slave 12, is, in addition, arranged beyond the master. In the set-up of FIG. 4 the signals transmitted from the master 10 and the slave 12 each arrive with a delay at measurement site (2) as a result of the additional cable length L2, so that the same average response time of the slave 12 is measured at measurement site (2) as in the set-up of FIG. 3. The same also applies to the set-up of FIG. 5, because the signals transmitted and received by the master 10 also arrive at measurement site (1) with the same delay as a result of the cable length L1. Fundamentally it is true that the measured response time does not alter if the measurement points are displaced to positions external to the connection between master 10 and slave 12, and are located on different sides of master and slave. As is explained once again with reference to FIGS. 7 to 10, this can be utilised in order to determine the average response times of a plurality of slaves with one and the same measurement set-up.

Figure 6:
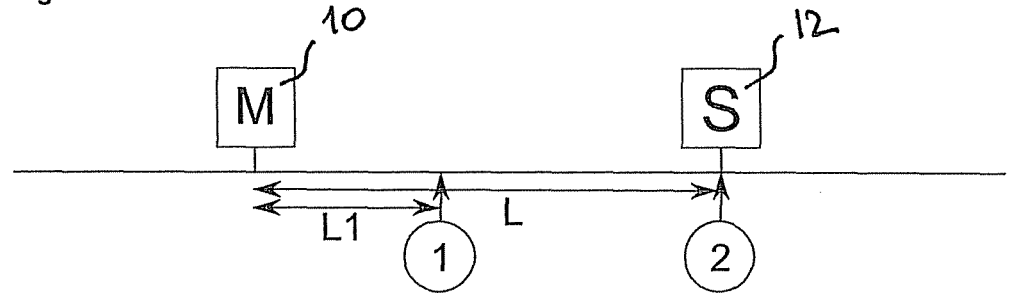
FIG. 6 shows a similar representation to that in FIG. 3 for purposes of explaining a further measurement set-up.

If on the other hand a measurement site is located between master 10 and slave 12, as shown in FIG. 6, then a shorter response time is determined at this measurement site (1) and the distance calculated between master and slave would then no longer be the actual distance, but would correspond to the distance between measurement unit (1) and slave 12.

Figure 7:
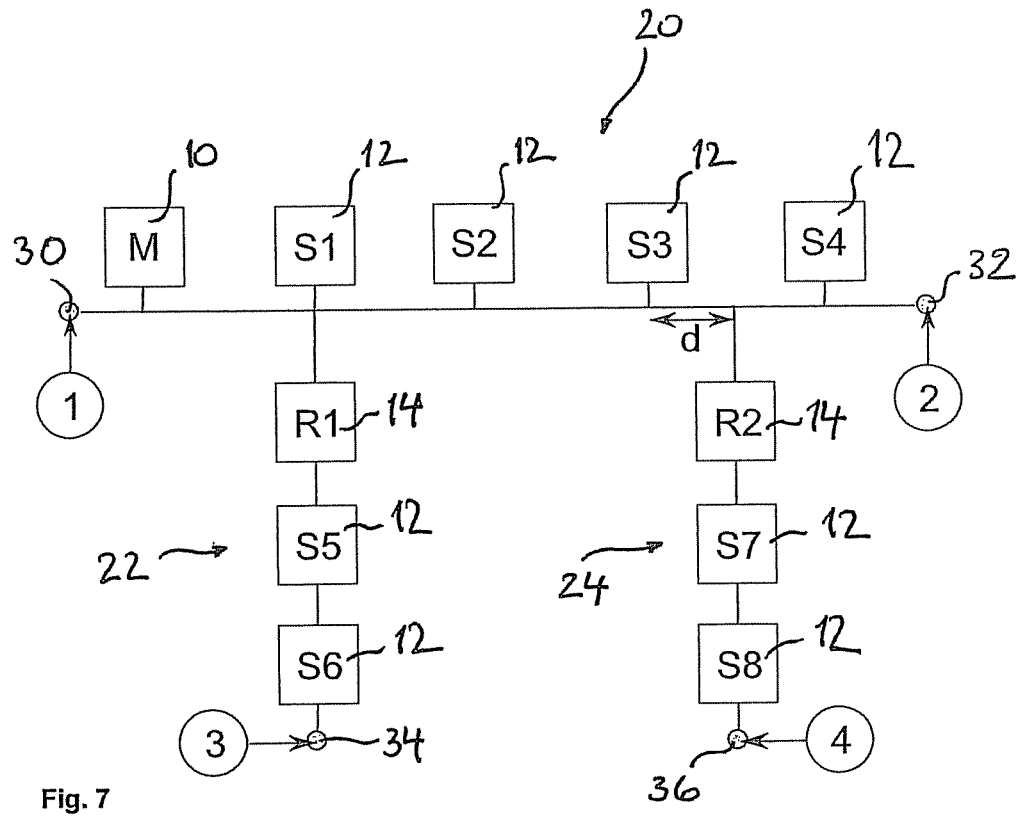
FIG. 7 shows an example of the topology of a databus for purposes of explaining an example.

FIG. 7 represents an example of a topology so as to illustrate that not only linear topologies, but also branched topologies, can be determined with examples of the method. In the example of a topology in FIG. 7 the bus network comprises one master 10, eight slaves 12 that are designated as S1 to S8, as well as two repeater stations 14 that are designated as R1 and R2. In the example measurements are taken in sequence at all ends of the bus for purposes of determining the complete topology. The measurement points (1) to (4) are represented by circles at the respective ends of the bus.

The network example consists of three physical segments 20, 22, 24 with the one master 10, two repeater stations 14, for example diagnostic repeaters with their own addresses, and a total of eight slaves 12. In addition four bus terminations 30, 32, 34, 36 are provided, which at the same time serve as the measurement sites (1) to (4). The main segment 20 consists of the master M and the four slaves S1 to S4. The two ancillary segments 22, 24, branching off in the form of a comb, are connected to the main segment 20 via the repeaters R1 and R2. The repeater R1 is arranged directly at the slave S1. The repeater R2 is connected to the main segment 20 at a distance d from the slave S3.

In this example the complete topology can be determined with four sets of measurements, as explained below. Two sets of measurements are first executed at the two ends 30, 32 of the main segment 20 at the measurement sites (1) and (2). On the basis of these sets of measurements the distances between the master M and the slaves S1, S2, S3 and S4 can be determined. In the first set of measurements at position (1) the average response times of the slaves S1 to S4 are determined as seen by the master, and in the second set of measurements at measurement position (2) the average response times of the slaves S1, S2, S3 and S4 are determined directly, that is to say, without the additional run time delay between master and slaves. By the calculation of differences, the run times and thus the distances between the master and the individual slaves, can then be calculated for each slave.

Figure 8:
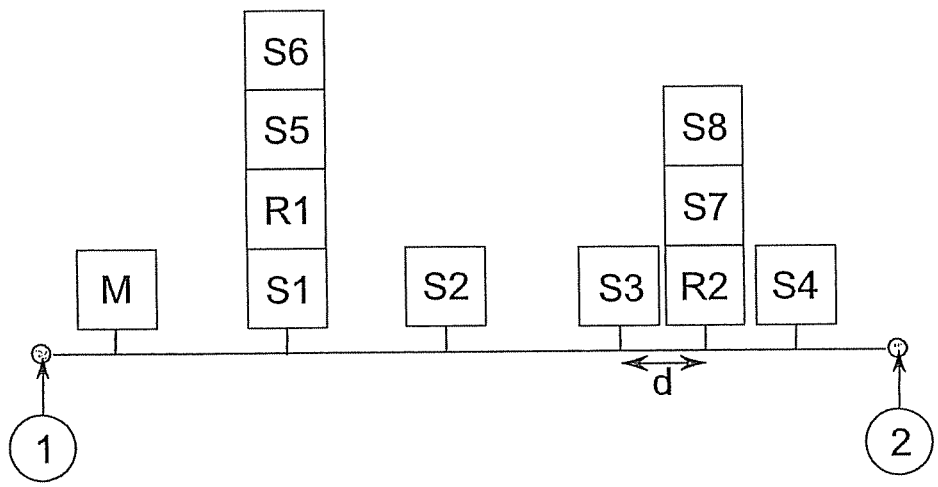
FIGS. 8, 9 and 10 show topology diagrams that ensue after the execution of sets of measurements at measurement positions 1 and 2, at position 3, and position 4, respectively.

In this method values are also derived for the slaves S5 to S8, which are located on the ancillary segments 22, 24 of the databus. For the distance of the slaves S5 and S6 from the master M the same value is in fact calculated as for S1, because the branch-off point of their ancillary segment 22 is located at S1. For the distance of the slaves S7 and S8 the distance of the related branch-off point is likewise determined, that is to say the distance of the slave S3 plus the length d. From the identical distances for the slaves S5 and S6 it can be concluded in the first instance that these lie on a common ancillary segment. The same is true for the slaves S7 and S8. The distances determined for these slaves thus in each case are the distances from the master M to the respective branch-off points of the ancillary segments 22, 24. From the sets of measurements at measurement sites (1) and (2) there results the topology diagram as shown in FIG. 8. The stations drawn one above another have in each case the same calculated distance from the master M.

In order to determine the topology of the ancillary segments 22, 24 correctly further sets of measurements are therefore executed at measurement positions (3) and (4). On the basis of the sets of measurements at measurement positions (1) and (3) the correct distances between the master M and the slaves S5 and S6 can be determined. For all other slaves, however, once again the same distance from the master ensues, namely the distance between master and slave S1. From this it can be concluded that the other stations S1, S2, S3, S4, S7, S8, with respect to the connection between the master M and the slaves S5 and S6, are located on an ancillary segment, whose distance from the master M is equal to the length between the master M and the slave S1. In order to calculate the exact distance from the master M to the slaves S5 and S6, the delay time of the repeater R1 must also be known, because its delay time is otherwise evaluated as an additional run time, and too great a distance ensues.

Figure 9:
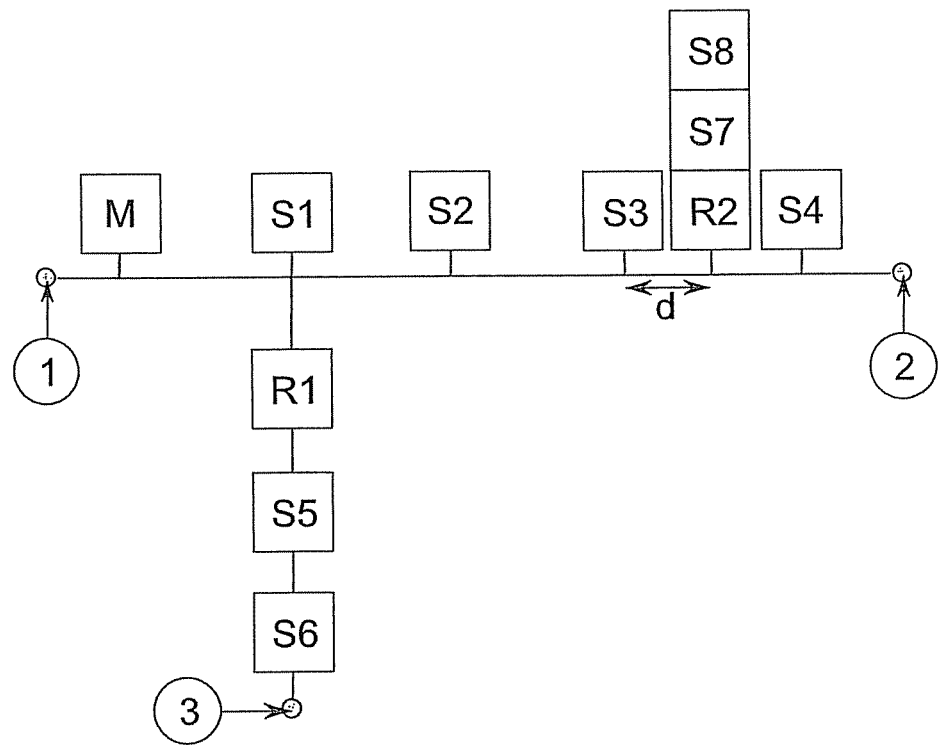

The combination of the results from the sets of measurements at measurement sites (1), (2) and (3) results in the topology diagram shown in FIG. 9. If one were only to take into account the sets of measurements at measurement positions (1) and (3) then a diagram would ensue in which the slaves S1 to S4, S7, S8 and the repeater R2 would all be located at the branch-off point at the slave S1. By taking into account the sets of measurements already executed previously, however, both the main segment 20 and also the first ancillary segment 22 can to a large extent be represented correctly.

The repeater functionality of the repeater station R1 cannot be directly discerned from the measurements. This repeater station R1 makes itself perceptible in terms of an additional run time delay, and, if the presence of the repeater station is unknown, in terms of a greater apparent distance to the slaves S5 and S6.

Figure 10:
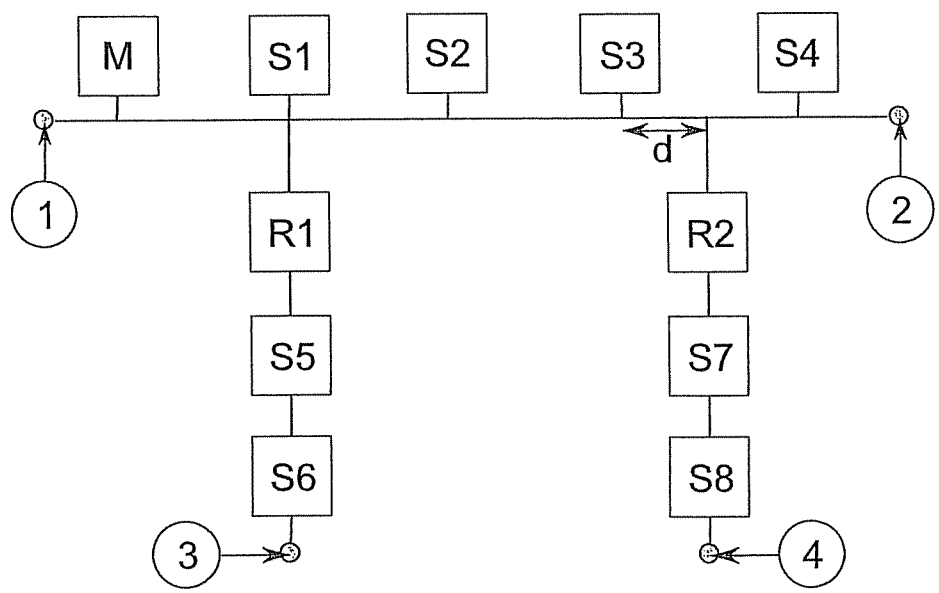

With the execution of a further set of measurements at measurement position (4) the correct distances between the master M and the slaves S7 and S8 can finally be derived. In order to calculate the correct absolute positions, in turn the delay time of the repeater station R2 must be known. FIG. 10 represents the topology diagram that ensues after execution of measurements at all four measurement positions (1) to (4).

For the example described, for purposes of determining the complete topology of a databus with N segments, N+1 sets of measurement data are derived. For the determination of the distances between master and slaves, N×(N+1)/2 pairs of measurements are evaluated, e.g. in each case at opposite ends of the bus. For each pair of measurements, distances for each slave from the master along a line ensue that can be represented in a distance vector. If measurements are made at each end of the bus, then the true distance of a slave from the master is the maximum of all the distances determined for this slave. A distance for a slave that is smaller than the maximum provides information about the distance of a branch-off point of a bus segment, on which the slave is located. If in a set of measurements for a plurality of slaves the same separation distance is determined, this is furthermore similar information to the effect that with respect to the two measurement positions, these slaves are located on the same ancillary segment, or are located directly at the branch-off point.

If one assumes that the distances between the master M and the slaves S1, S2, S3, . . . , S8 correspond to the lengths L1, L2, L3, . . . , L8, then for the slaves S1, S2, S3, . . . , S8 from the measurement datasets at measurement sites (1) and (2) there is derived a distance vector:

$$\begin{bmatrix} L1 \\ L2 \\ L3 \\ L4 \\ L1 \\ L1 \\ L3+d \\ L3+d \end{bmatrix}$$

From the measurement datasets at measurement sites (1) and (3) there is derived:

$$\begin{bmatrix} L1 \\ L1 \\ L1 \\ L1 \\ L5 \\ L6 \\ L1 \\ L1 \end{bmatrix}$$

and from the measurement datasets at measurement sites (1) and (4) there is derived:

$$\begin{bmatrix} L1 \\ L2 \\ L3 \\ L3+d \\ L1 \\ L1 \\ L7 \\ L8 \end{bmatrix}$$

The final distance vector is derived from the maximum of all distances determined for the slaves as:

$$\begin{bmatrix} L1 \\ L2 \\ L3 \\ L4 \\ L5 \\ L6 \\ L7 \\ L8 \end{bmatrix}$$

The method can use a topology diagram, which brings the distance vectors determined into a format that is suitable for the presentation of the topology.

In an example it is to be assumed that for purposes of calculating the average response times M telegram pairs, that is to say, request and response telegrams, are observed, wherein in this example M=100. If the observed telegram pairs are data exchange telegrams, then these are, for example, transmitted in a PROFIBUS network once per input/output cycle, whereby the duration of an input/output cycle can be of the order of between 10 and 100 ms. If, for example, 30 slaves are connected in line to the fieldbus system, then with this assumption a response time per slave can be determined within between 300 and 3000 ms. If one further assumes that for purposes of calculating the average response time of each slave 100 response times at the master and 100 response times at or beyond each slave are to be determined in each case, whereby when these measurements are executed in sequence with a single measurement unit, the required measurement time at each measurement site amounts is approximately to between 0.5 and 5 minutes. The measurement does not interfere with the data communication on the fieldbus, but rather monitors the data traffic on, for example, the data exchange telegrams.

Figure 11:
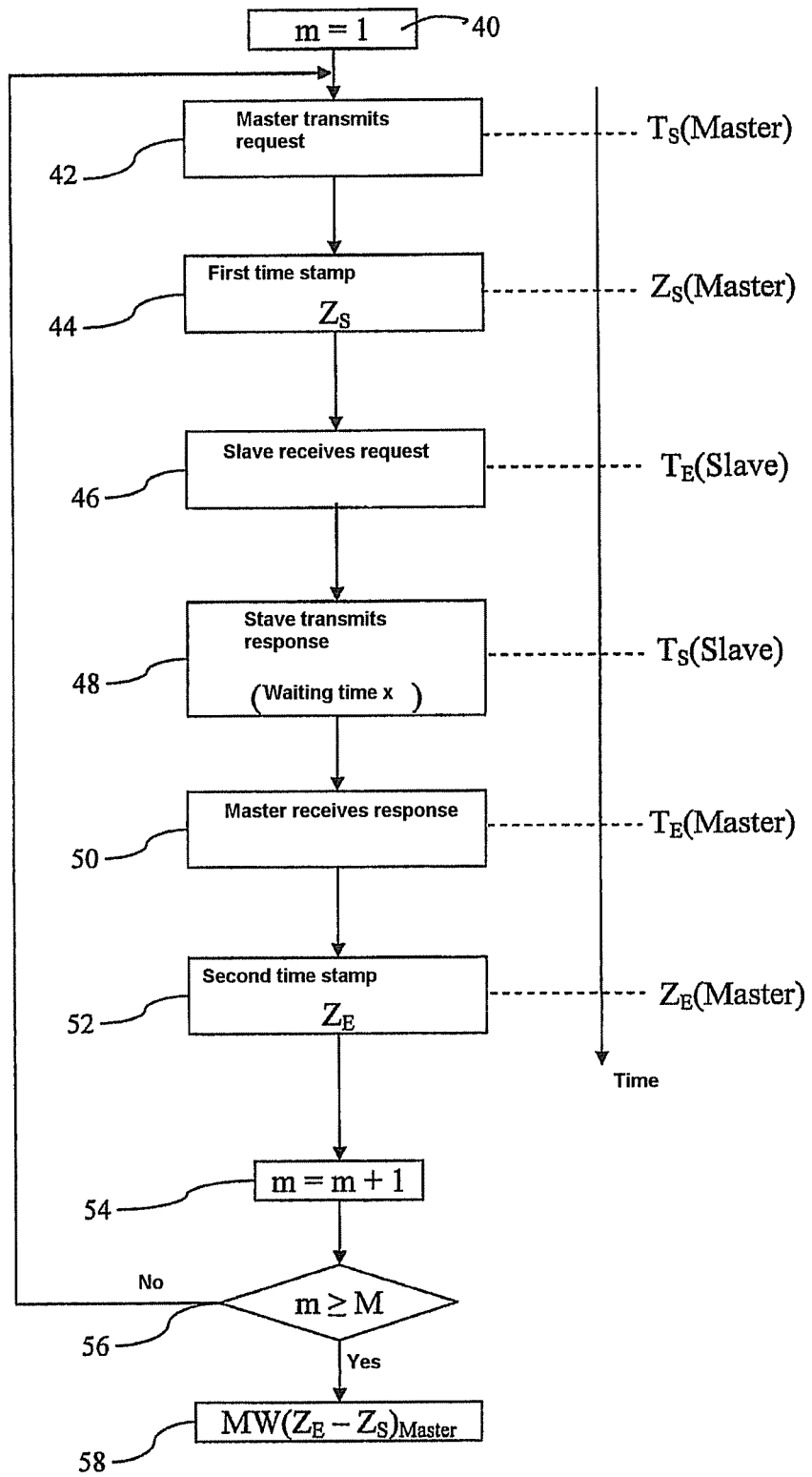
FIG. 11 shows a flow diagram for an example of a first part of the method for registering response times at the master.
Figure 12:
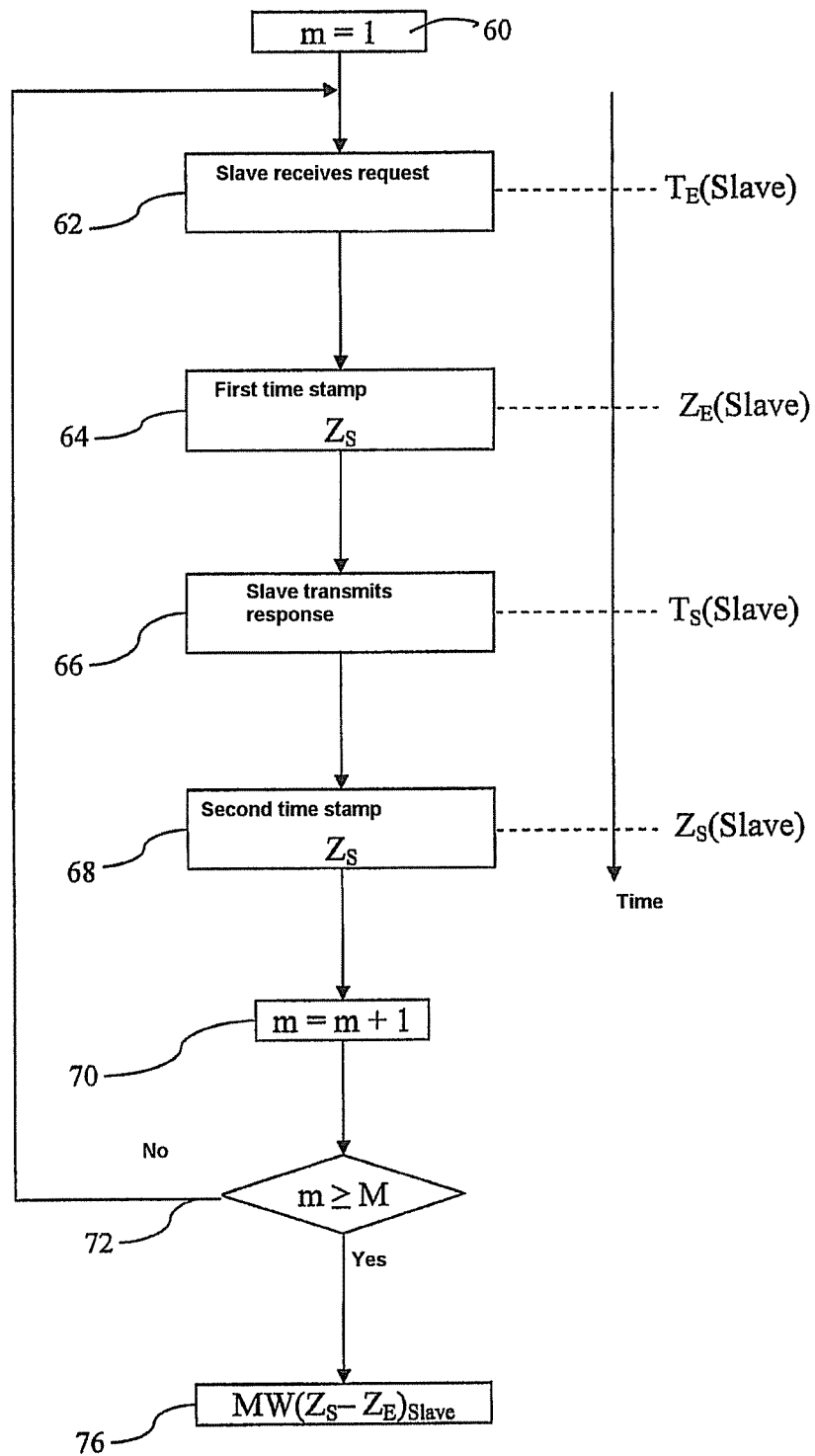
FIG. 12 shows a flow diagram for an example of a second part of the method for registering response times at the slave.

FIGS. 11 and 12 show examples of flow diagrams for the execution of a first and second set of measurements for purposes of detecting response times at the master and slave respectively.

In each case the individual events are represented at the right-hand side of the flow diagram on a timeline; however, this is to be understood as not to scale.

In what follows the detection of the response times at the master is described with reference to FIG. 11. In the interests of simplicity the figure shows the detection of response times with respect to only one slave, whereby the person skilled in the art will understand that the responses and related response times of a plurality of slaves can be detected in a corresponding manner.

The method for determining the average response times of each slave, measured at the master, begins with a first step 40, with the setting of a counter to m=1, if the measurement unit is connected at, or in the vicinity of, the master. The counter serves to determine the number of response times that are to be incorporated into the calculation of the average value. At a point in time $T_S$(Master) a master transmits a request telegram (Step 42) to a slave unit; this is received by a measurement unit at almost the same time. In step 44 the measurement unit at the measurement site that is associated with the master unit, generates at its next clock pulse is edge a first time stamp $Z_S$ (Master). After a run time $T_L$, which is a function of the distance between master and slave, the slave unit receives the request telegram in step 46. The request telegram has a prescribed length of x bit times; in the case of the FDL status telegram in accordance with the PROFIBUS standard this is 66 bit times. Furthermore a minimum waiting time is defined for each slave before it can transmit a response; in the selected example of the PROFIBUS standard this is 11 bit times. Thus the slave, in a next step 48, transmits a response telegram at a time $T_S$(Slave), which in the selected example occurs at the earliest 77 bit times after the reception time $T_E$(Slave). After the run time $T_L$ this is received (step 50) by the master at a reception time $T_E$(Master). The measurement unit also receives the response telegram at almost the same point in time, and generates at its next clock pulse edge a second time stamp $Z_E$(Master) in step 52.

In this manner the exchange and detection of a telegram pair is completed, and in the next step 54 the counter m is incremented, that is to say, m=m+1. In the following step 56 a check is made as to whether a prescribed number of measurements has already been executed, i.e. m≥M?, where M, for example, is 100. If this is not the case, the measurement loop returns to step 42, in order to monitor another input/output cycle. If a sufficient number of measurements have taken place, then the detected transmission and reception times, or rather, the corresponding time stamps $Z_S$(Master) and $Z_E$(Master) of the measurement unit, are transferred to the master for purposes of calculating the average response times in step 58. For purposes of calculation the average values an average value algorithm of known art, such as the arithmetic mean, can be used. In addition it is possible, by using a suitable filter, to detect outlier values in the set of measurements, which can, for example, be caused by singular events, and to filter these out from the calculation of the average values. It is also possible by means of a suitable evaluation of the set of measurements to detect a deviation in the distribution of the measured values between two sets of measurements, and from this to draw conclusions, where appropriate, as to any alteration of the state of the bus.

If the measurements for one or a plurality of slave units at the master have been completed, the measurement unit can be separated from the master and connected at or beyond one of the slaves. The measurement method at the slave is represented in FIG. 12.

Also when the measurement unit has been connected at a second measurement position that is associated with the slaves, a counter is firstly set to m=1, as represented in step 60. The measurement method begins when the slave receives the first defined request telegram at a time $T_E$(Slave), as represented in step 62. At the same time the measurement unit also receives the telegram and generates a first time stamp $Z_E$(Slave) in step 64. After reception of the request telegram is complete, and the defined waiting time has elapsed, as explained above, in step 66 the slave transmits its response telegram at a time $T_S$(Slave). In turn this is received at the same time by the measurement unit, which generates a second time stamp $Z_S$(Slave) in step 68. If the measurement unit is connected at some distance from the slave, it receives the request and response telegrams in each case after the same delay times, so that the same response time $Z_S$-$Z_E$ ensues. In this manner a measurement cycle is completed at the slave, and in step 70 the counter is incremented, i.e. m=m+1. In the next step 72 a check is made as to whether a prescribed number of measurements has already been executed, i.e. m≥M?. If the answer is "no", the measurement unit runs through a further measurement cycle, and returns to step 62. If the answer is "yes", the response times $Z_S$-$Z_E$, that have been determined are transferred to an algorithm for purposes of calculating an average value, which is executed in step 76. The average value is calculated in the same way as the average response time at the master. In this manner the determination of the average response time of a slave is completed.

As explained above, the average response times at master and slave are then subtracted in order to determine the run time delay between master and slave.

By extending the measurement time any accuracy can theoretically be achieved for the distance measurement. In practice the accuracy that can be achieved is limited by processes internal to the units in the bus subscribers. For example, all conventional oscillators that are used as clock generators in the units are to a certain degree temperature-dependent. Depending upon the heat generated by the electronic components in the slave, variations in the clock rate can lead to slight variations in the response behaviour.

One prerequisite for the applicability of the method is that the state of the bus should not alter during the various measurements. The measurements should therefore take place as close in time to one another as possible. A small alteration in the response behaviour of the slave can lead to large errors in the distance measurement.

In practice the time stamp generated by the measurement unit should also be sufficiently accurate, and should not be subject to any time drift, for example, in the presence of temperature variations. Furthermore the sampling rate of the measurement unit should also be sufficiently high in order that a high level of time resolution is ensured.

With examples of the method variations in the response times of a slave can be cancelled out, independently of whether a slave responds within the minimum defined response time $minT_{SDR}$, or only with an additional delay, inasmuch as it requires a longer time for the processing of the telegram. Test and simulations on fieldbus systems with different slaves, which have been operated at different baud rates, have shown that the method delivers good results both in the first case, in which the slave transmits its response immediately after the minimum waiting time has elapsed, and also in the second case, in which the slave responds only after it has completed the processing of a telegram.

As explained earlier, an alteration of the state of the bus, the ambient temperature, or similar, to can lead to alterations in the average response time. The measurement results would thereby be falsified. When using the method care should therefore be taken that the state of the bus, that is to say, the overall state of the units connected and their activities, does not alter between measurements. The same is true for ambient temperature, moisture level, and similar.

The invention claimed is:

1. A method for determining the topology of a serial asynchronous data bus, to which at least a first bus subscriber and a second bus subscriber are connected, which subscribers communicate via a prescribed bus access protocol that comprises defined request and response telegrams, the method comprising:
   sending request telegrams from the first bus subscriber and receiving the request telegrams at the second bus subscriber,
   sending a respective response telegram from the second bus subscriber in response to each request telegram, and receiving the response telegrams at the first bus subscriber,
   determining, at a first measurement site positioned on the data bus on a side of the first bus subscriber opposite the second bus subscriber, a first plurality of time differences between the reception of a particular request telegram of the first bus subscriber and the reception of a respective related response telegram of the second bus subscriber,
   determining, at a second measurement site positioned on the data bus on a side of the second bus subscriber opposite the first bus subscriber, a second plurality of time differences between the reception of the particular request telegram of the first bus subscriber and the reception of the respective related response telegram of the second bus subscriber, and
   calculating a first average response time $T_{res1}$ for the second bus subscriber, from the determined first plurality of time differences,
   calculating a second average response time $T_{res2}$ for the second bus subscriber from the determined second plurality of time differences,
   calculating a run time delay $T_L$ as half of the difference between the first average response time $T_{res1}$, and the second average response time $T_{res2}$, thus enabling deduction of a distance between the first bus subscriber and the second bus subscriber.

2. The method in accordance with claim 1, wherein the second measurement site is located at one end of the bus behind the last second bus subscriber.

3. The method in accordance with claim 1, wherein determining the first plurality of time differences for the first bus subscriber between the reception of the particular request telegram of the first bus subscriber and the reception of the respective related response telegram of the second bus subscriber at the first measurement site, and determining the second plurality of time differences between the reception of the particular request telegram of the first bus subscriber and the reception of the respective related response telegram of the second bus subscriber at the second measurement site on the data bus, the same measurement unit is used.

4. The method in accordance with claim 3, wherein the first bus subscriber, the second bus subscriber, and the measurement unit operate with their own, non-synchronised clock frequencies.

5. The method in accordance with claim 1, wherein the second average response time $T_{res2}$ for the second bus subscriber is determined in advance.

6. The method in accordance with claim 1, wherein the run time delay $T_L$ is calculated in accordance with the following formula:

$$T_L = \frac{(T_{res1} - T_{res2})}{2}.$$

7. The method in accordance with claim 1, wherein the request telegrams and response telegrams are regular telegrams of the bus access protocol and are exchanged during regular data traffic on the data bus.

8. The method in accordance with claim 1, wherein the request telegrams and response telegrams are data exchange telegrams, which are exchanged once in each input/output cycle of a bus subscriber, or are FDL status telegrams.

9. The method in accordance with claim 1, wherein the first bus subscriber is a master unit, and the second bus subscriber is a slave unit.

10. The method in accordance with claim 9, wherein:
(a) the master unit transmits a request telegram to the slave unit at a transmission point in time $T_0$,
(b) the measurement unit at the first measurement site receives the request telegram and at the next clock pulse edge generates a first time stamp $Z_S$,
(c) the slave unit receives the request telegram after a run time $T_L$, which is a function of the distance between the master unit and slave unit, wherein the request telegram has a length of x bit times,
(d) after reception of the request telegram is complete and a waiting time of y bit times has elapsed, the slave unit transmits the respective response telegram,
(e) after the run time $T_L$ the master unit receives the response telegram at a point in time $T_E$,
(f) the first measurement unit receives the response telegram and at its next clock pulse edge generates a second time stamp $Z_E$, and
(g) from the difference between the first and second time stamps a response time $T_{res}$, which is associated with the master unit is determined, and
wherein the acts (a) to (g) are repeated a number of times, wherein spreading of response times which occurs as a result of variations in the waiting time of the slave unit is cancelled out by means of an average value algorithm for the calculation of the average response time $\overline{T}_{res1}$.

11. The method in accordance with claim 10, wherein a plurality of slave units are connected to the data bus, which repeatedly exchange request and response telegrams with the master unit.

12. The method in accordance with claim 11, wherein determining a first plurality of time differences between the reception of the particular request telegram of the first bus subscriber and the reception of the respective related response telegram of the second bus subscriber at the first measurement site further comprises determining the time differences for request and response telegram pairs, which are associated with different slave units, and wherein calculating the first average response time $\overline{T}_{res1}$ comprises calculating an average response time for each of the slave units at the master unit.

13. The method in accordance with claim 12, wherein for each of the slave units the difference between the related average response time at the master unit and the average response time that is associated with the respective slave unit, is calculated, and the respective run time delay $T_L$, and thus the respective distance between the master unit and each of the slave units, is derived from the respective differences.

14. The method in accordance with claim 12, wherein from the respective run time delays $T_L$ between the master unit and the plurality of slave units, an order is determined for the slave units along the data bus, or a data bus section with a linear topology.

15. The method in accordance with claim 14, wherein if for a plurality of slave units the same or approximately the same run time delay $T_L$ is determined, a branch-off point in the data bus is detected and the following further acts are carried out:
determining a third plurality of time differences for a slave unit between the reception of the request telegrams and the reception of related response telegrams at a third measurement site on the data bus, wherein the third measurement site is located behind the branch-off point in the data bus at the slave unit, or, as viewed from the master unit, behind the slave unit, and
calculating a third average response time $\overline{T}_{res3}$ that is associated with the slave unit which is located behind the branch-off point in the data bus from the third plurality of differences.

16. The method in accordance with claim 1, wherein determining the first plurality of time differences between the reception of the particular request telegram of the first bus subscriber and the reception of the respective related response telegram of the second bus subscriber at the first measurement site on the data bus, and determining the second plurality of time differences between reception of request telegrams and reception of related response telegrams at a second or third measurement site, are carried out under the same, or basically the same, operating conditions with reference to the state and physical parameters of the data bus.

17. A method for determining the topology of a serial asynchronous data bus, to which at least a first bus subscriber and a second bus subscriber are connected, which subscribers communicate via a prescribed bus access protocol that comprises defined request and response telegrams, wherein the first bus subscriber comprises a master unit, and the second bus subscriber comprises a slave unit, the method comprising:
(a) the master unit sends a request telegram to the slave unit at a transmission point in time $T_0$,
(b) a measurement unit located on the serial bus on a side of the master unit opposite a side of the slave unit, receives the request telegram and at the next clock pulse edge generates a first time stamp $Z_S$,
(c) the slave unit receives the request telegram after a run time $T_L$, which is a function of the distance between the master unit and slave unit, wherein the request telegram has a length of x bit times,
(d) after reception of the request telegram is complete and a waiting time of y bit times has elapsed, the slave unit sends a response telegram,
(e) after the run time $T_L$ the master unit receives the response telegram at a point in time $T_E$,
(f) the measurement unit receives the response telegram and at its next clock pulse edge generates a second time stamp $Z_E$, and
(g) from the difference between the two time stamps a response time $T_{res}$, which is associated with the master unit, is determined, and
wherein the acts (a) to (g) are repeated a number of times, wherein spreading of response times which occurs as a result of variations in the waiting time of the slave unit is cancelled out by means of an average value algorithm for the calculation of an average response time $\overline{T}_{res1}$ from the determined multiple response times $T_{res1}$.

* * * * *